United States Patent
Uchimura et al.

(10) Patent No.: US 11,272,718 B2
(45) Date of Patent: Mar. 15, 2022

(54) FLAVOR OIL-AND-FAT

(71) Applicant: MITSUBISHI CORPORATION LIFE SCIENCES LIMITED, Tokyo (JP)

(72) Inventors: Nobuhiro Uchimura, Tokyo (JP); Hirotaka Yamashita, Tokyo (JP); Sakiko Ikeda, Tokyo (JP); Toshiya Sato, Tokyo (JP); Maiko Yoshino, Tokyo (JP)

(73) Assignee: MITSUBISHI CORPORATION LIFE SCIENCES LIMITED, Tokyo (JP)

( * ) Notice: Subject to any disclaimer, the term of this patent is extended or adjusted under 35 U.S.C. 154(b) by 0 days.

(21) Appl. No.: 16/483,554

(22) PCT Filed: Feb. 7, 2018

(86) PCT No.: PCT/JP2018/004209
§ 371 (c)(1),
(2) Date: Nov. 1, 2019

(87) PCT Pub. No.: WO2018/147326
PCT Pub. Date: Aug. 16, 2018

(65) Prior Publication Data
US 2020/0068916 A1    Mar. 5, 2020

(30) Foreign Application Priority Data

Feb. 8, 2017 (JP) .............................. JP2017-021340

(51) Int. Cl.
*A23D 9/007* (2006.01)
*A23D 9/02* (2006.01)
*A23L 33/145* (2016.01)

(52) U.S. Cl.
CPC ............ *A23D 9/007* (2013.01); *A23D 9/02* (2013.01); *A23L 33/145* (2016.08); *A23V 2002/00* (2013.01)

(58) Field of Classification Search
CPC .......... A23D 9/007; A23D 9/02; A23D 7/013; A23D 7/04; A23L 33/145; A23V 2002/00
USPC ........................................................ 426/901
See application file for complete search history.

(56) References Cited

U.S. PATENT DOCUMENTS

| 2010/0183767 A1 | 7/2010 | Noordam et al. |
| 2014/0099402 A1 | 4/2014 | Noordam et al. |
| 2014/0234526 A1 | 8/2014 | Yasumatsu et al. |

FOREIGN PATENT DOCUMENTS

| JP | 2010-81886 | | 4/2010 | |
| JP | 2010081886 A | * | 4/2010 | |
| JP | 2010-532981 | | 10/2010 | |
| JP | 20100532981 A | * | 10/2010 | |
| JP | 2014-515273 | | 6/2014 | |
| JP | 20140515273 A | * | 6/2014 | |
| JP | 2017-153432 | | 9/2017 | |
| WO | 2013/031571 | | 3/2013 | |
| WO | WO-2013031571 A1 | * | 3/2013 | ......... A23L 2/56 |

OTHER PUBLICATIONS

International Search Report issued in International Patent Application No. PCT/JP2018/004209, dated May 15, 2018 with English translation.
International Preliminary Report on Patentability issued in International Patent Application No. PCT/JP2018/004209, dated Aug. 13, 2019 with English translation.

* cited by examiner

*Primary Examiner* — Deborah D Carr
(74) *Attorney, Agent, or Firm* — Greenblum & Bernstein, P.L.C.

(57) ABSTRACT

[Problem] To suppress the oxidized odor of an oil-and-fat, enhance and sustain the flavor and taste of a raw material oil-and-fat, provide or enhance the oil-and-fat flavor of meat, or provide an oil-and-fat imparted or enhanced with the oil-and-fat flavor of meat. [Solution] The present invention provides a flavor oil-and-fat obtained by adding a yeast digest to an edible oil-and-fat and heating the resulting mixture, wherein the yeast digest is a yeast autolysate or a yeast enzyme digest, contains a water-soluble component derived from yeast, an insoluble component derived from yeast, a lipid derived from yeast, at least 4 wt % of RNA, and at least 15 wt % of peptide, and contains 65% or more of water-soluble components after solubilization of the yeast.

8 Claims, No Drawings

FLAVOR OIL-AND-FAT

TECHNICAL FIELD

The present invention relates to a flavor oil/fat that has a meat flavor, a rich taste, and a cooked flavor, and is composed mainly of an edible oil.

BACKGROUND ART

In prior art, as a method for improving the flavor of an oil/fat, saccharides and amino acids are stirred under heating in the oil/fat to cause Maillard reaction, and the flavor is transferred to the oil/fat; after the heating, only the oil/fat is isolated, and used as a seasoning oil. However, the method for separating only the oil/fat is not so powerful in enhancing the flavor of the oil/fat. Furthermore, there are problems such as that the quality of the flavor is different from the flavor of the original oil/fat.

In order to solve these problems, Patent Literature 1 reports that the flavor oil/fat, which is obtained by adding a sugar, an amino acid, and a water-insoluble matter into an oil/fat, stirring it under heating to integrate the Maillard reaction product with the water-insoluble matter, followed by addition of a peptide, has a titer of high flavor and a flavor with a real feeling. This method requires the addition of a water-insoluble matter and a peptide as raw materials for achieving a flavor with a sufficient titer and a real feeling. Therefore, there are problems that the process is complicated, and the formed powder can influence the feeling of the food on the tongue.

In Patent Literature 2, a solid or semi-solid flavor oil having a flavor, a rich taste, and a cooked flavor of meat is obtained by heat reaction of a yeast extract processing seasoning, which has been prepared by subjecting a reducing sugar and a yeast extract to Maillard reaction, a solid oil/fat substantially free of vitamin E, and water. What is characteristic is that the use of a yeast extract processed seasoning that has been obtained by subjecting a reducing sugar and a yeast extract to Maillard reaction in advance.

Additionally, even though the object is different, Patent Literature 3 uses a yeast extract for suppressing the animal scent of oils and fats. Patent Literature 4 describes, as a method for producing non-sticky oils and fats, the production of a solid flavor oil including mixing a saccharide, an amino acid, and water under overheating.

CITATION LIST

Patent Literature

Patent Literature 1: JP 10-262595 A
Patent Literature 2: JP 2006-166873 A
Patent Literature 3: JP 2010-81886 A
Patent Literature 4: JP 3-183441 A

SUMMARY OF INVENTION

Technical Problem

The object to be solved by the present invention is to obtain a flavor oil/fat that suppresses the oxidized odor of oils and fats, and enhances and prolongs the flavor and taste of the raw oils and fats. Another object is to provide a flavor oil/fat that imparts or enhances a livestock fat flavor to the flavor oil/fat.

Solution to Problem

The main aspect of the present invention is to produce a flavor oil/fat obtained by adding a yeast digest to an edible oil/fat, and heating the edible oil/fat with the yeast digest added thereto. The heating temperature is preferably 85° C. or higher, and the heating temperature retention time is preferably 1 minute or more.

Specifically, the invention has the following aspects.

(1) A flavor oil/fat obtained by adding a yeast digest to an edible oil/fat, and heating the edible oil/fat with the yeast digest added thereto.

(2) The flavor oil/fat according to (1), wherein the yeast digest includes a water-soluble component derived from a yeast, an insoluble component derived from a yeast, and a lipid derived from a yeast, the water-soluble component after solubilization of the yeast is 65% or more, the RNA content is 4% by weight or more, and the peptide content is 15% weight or more.

(3) The flavor oil/fat according to (1) or (2), wherein the flavor oil/fat is obtained by adding 0.05 to 10 parts by weight of the yeast digest according to (2) to 100 parts by weight of an edible oil/fat, and heating the edible oil/fat with the yeast digest added thereto.

(4) The flavor oil/fat according to (1) or (2), wherein the heating temperature is 85° C. or higher, and the temperature retention time of the heating temperature is 1 minute or more.

(5) A method for producing a flavor oil/fat, including adding 0.05 to 10 parts by weight of the yeast digest according to (2) to 100 parts by weight of an edible oil/fat, and heating the edible oil/fat with the yeast digest added thereto at 85° C. or higher for a temperature retention time of 1 minute or more.

Advantageous Effects of Invention

The flavor oil/fat of the present invention uses a yeast digest that has not been used in the production of flavor oils/fats, and thus has a less oxidized odor, and provides, for example, a chicken oil having a strong chicken flavor, a pork oil having a strong pork flavor, a beef oil having a strong beef flavor, and a vegetable oil having a cooked flavor of cooked meat.

The flavor oil/fat of the present invention uses no meat as a raw material other than oils and fats, but sufficiently has a meat flavor, a rich favor, and a cooked flavor, and thus can be widely used in food processing. Additionally, the yeast digest as a raw material has advantages that it is more stably obtained at lower costs than meats.

DESCRIPTION OF EMBODIMENTS

The flavor oil/fat of the present invention is produced by adding a yeast digest to an edible oil/fat, and heating the edible oil/fat with the yeast digest added thereto.

The type of the edible oil/fat used in the present invention is not particularly limited, and animal oils and fats and vegetable oils and fats may be used. Specific examples include vegetable oils and fats such as rapeseed oil, canola oil, soybean oil, sunflower seed oil, cottonseed oil, peanut oil, rice bran oil, corn oil, safflower oil, olive oil, kapok oil, sesame oil, evening primrose oil, palm oil, shear fat, monkey fat, cacao fat, coconut oil, and palm kernal oil, and animals oils and fats such as lard (pork oil), beef tallow (beef oil), and chicken oil. Additionally, in the present invention, animal or vegetable oils and fats may be used alone or in combination. Furthermore, oils and fats processed by, for example, fractionation, curing, or interesterification may be used.

The yeast digest used in the present invention is obtained by enzymatic degradation of a yeast, and enzymatic degradation is achieved by yeast autolysis or enzyme addition. Furthermore, in the present invention, degradation by both of autolysis and enzyme addition may be performed, or a yeast autolysate, which is obtained by autolysis of an enzyme, and/or an enzyme degradation product of a yeast, which is obtained by adding an enzyme to a yeast, may be used. Examples of the yeast material of the yeast digest include yeasts for food use such as bread yeasts, beer yeasts, and Torula yeasts, and among them, Torula yeasts are preferred. The method for culturing yeasts is not particularly limited, and known culture methods are used.

The method of enzymatic degradation of the yeast material is not particularly limited, and may use a common method. For example, when the yeast material is degraded with an enzyme such as glucanase or protease, the enzyme reaction is carried out so as to achieve the below-described soluble component ratio. When autolysis is used, a known method may be used without particular limitation. Furthermore, both of the enzyme method and autolysis may be performed for solubilization. Through this solubilization, the proportion of the water-soluble component is preferably increased to 65% or more, and more preferably 80% or more. The proportion of the water-soluble component is the proportion of the water-soluble component relative to the total dry weight. The water-soluble component is measured by as follows; a sample is suspended in ten times the amount of water, and then centrifuged at 5000 rpm for 10 minutes to obtain a supernatant, and the supernatant is dried to obtain a solid and used as a water-soluble component. The proportion (%) of the water-soluble component relative to the dry weight of the sample is used as the proportion of the water-soluble component.

In the present invention, in the process of degradation by autolysis or enzyme addition, in the case where the action of protease or nuclease is used, it is more preferred that 4% by weight or more of RNA (not decomposed to mononucleotide) and 15% by weight of more of peptide be remained rather than they are completely reacted.

The yeast digest used in the present invention is not a yeast extract from which only the water-soluble component is extracted, but a composition also including an insoluble component and a lipid derived from a yeast.

The yeast was partially solubilized by autolysis or enzyme reaction, and then dried into a solid or a powder. An excipient may be used when the yeast is dried drying. For example, an extraction residue of a yeast extract may be added as an excipient, followed by drying with a drier. Examples of the extraction residue of the yeast extract include "KR yeast" manufactured by KOHJIN Life Sciences Co., Ltd.

The peptide content in the yeast digest of the present invention is preferably 15% by weight or more, more preferably 20% by weight or more, and even more preferably 30% by weight or more. The RNA content not decomposed to mononucleotide of the yeast digest of the present invention is preferably 4% by weight or more, more preferably 6% by weight or more, further preferably 6.5% by weight or more, and most preferably 7% by weight or more. The free amino acid content in the yeast digest of the present invention is preferably 8% by weight or more, more preferably 10% by weight or more, and even more preferably 12% by weight or more. The dietary fiber content in the yeast digest of the present invention is preferably 10% by weight or more, more preferably 12% by weight or more, and even more preferably 15% by weight or more. The phospholipid content in the yeast digest of the present invention is preferably 1% by weight, more preferably 1.5% by weight or more, and even more preferably 2% by weight or more. The total content of guanylic acid and inosinic acid in the yeast digest of the present invention is preferably 10% by weight or less, more preferably 8% by weight or less, and even more preferably 5% by weight or less. The contents of the substances in the seasoning are measured by the method described in Examples.

The addition proportion of the yeast digest added to the edible oil/fat of the present invention depends on the edible oil/fat and yeast digest to be used, and can be adjusted as appropriate. The proportion of the yeast digest is usually from 0.05 to 10 parts by weight, more preferably from 0.1 to 5 parts by weight, and even more preferably from 0.1 to 1 part by weight with reference to 100 parts by weight of the edible oil/fat.

The flavor oil/fat of the present invention can be produced by adding a yeast digest to an edible oil/fat, and heating the edible oil/fat with the yeast digest added thereto. The heating temperature is preferably 85° C. or higher, more preferably 91° C. or higher, and even more preferably 95° C. or higher. The upper limit of the temperature is below 130° C., more preferably below 125° C., even more preferably below 121° C., and most preferably below 105° C.

The heating time at the above-described temperature is preferably 1 minute or more, more preferably 5 minutes or more, and even more preferably 10 minutes or more. The upper limit of the time is preferably within 18 hours, more preferably within 10 hours, more preferably less than 1 hour, even more preferably less than 30 minutes, and most preferably less than 20 minutes.

The flavor oil/fat of the present invention under heating may include other substance, as long as its reaction will not be inhibited.

The flavor oil/fat of the present invention after preparation may be mixed with various seasonings and excipients, or antioxidants such as vitamin E. Additionally, it may be, for example, pulverized or solidified by mixing with a pulverized raw material such as dextrin.

The flavor oil/fat of the present invention may be used as, for example, a frying oil, and may be a raw material of a water-in-oil emulsified oleaginous composition such as margarine or shortening. Examples of the usage include, in the same manner as common edible oils/fats, stir-frying oil, mixing, spraying, and immersion. Additionally, it may be mixed or combined with a common edible oil/fat. Furthermore, it may be used as a raw material of various seasonings and foods. Examples thereof include seasonings such as sources and dressings, meat products such as hams and sausages, processed foods such as ramen, side dishes, and frozen foods.

When the flavor oil/fat of the present invention is subjected to a heating reaction, it forms a complicated composition that is difficult to be analyzed to identify specific differences, and thus reduces its oxidized odor, and increases or adds a fragrant flavor and an animal odor.

EXAMPLES

The present invention is specifically described below with reference to examples and comparative examples. The present invention will not be limited to them.

<Method for Measuring Free Amino Acid Content>

A yeast extract sample was dissolved in 0.02 N HCl, and used as a measurement sample. The sample was measured with an amino acid analyzer (high speed amino acid analyzer L-8900, manufactured by Hitachi, Ltd.).

<Method for Measuring Total Amino Acid Content>

Yeast extract sample was dissolved in 6 N HCl, and allowed to stand at 110° C. for 24 hours for hydrolysis. As portion of the sample was diluted with 0.02 N—HCl, and used as a sample for measuring the total amino acid content. The sample was measured with an amino acid analyzer (high speed amino acid analyzer L-8900, manufactured by Hitachi, Ltd.).

<Method for Measuring Peptide Content>

The peptide content was calculated by subtracting the free amino acid content from the total amino acid content.

<Method for Measuring RNA Content>

A solution of a yeast extract sample in ultrapure water was used as the measurement sample, and measured by HPLC. The column was Asahipak HPLC column GS-320H, the eluate was 0.1 M sodium phosphate buffer, and the detection wavelength was 260 nm.

<Method for Measuring 5'-Mononucleotide>

A solution of a yeast extract sample in ultrapure water was used as the measurement sample, and measured by HPLC. The column was MCI GEL CDR10 (4.6×250) (manufactured by Mitsubishi Chemical Corporation), the mobile phase was a 2M ammonium acetate buffer solution (pH 3.3), and the detection wavelength was 260 nm.

<Method for Measuring Phospholipid Content>

The sample is extracted by the Folch method, and subjected to thin-layer chromatography by two-dimension development. Silica gel was used as the thin layer plate, tetrahydrofuran:acetone:methanol and water (50:20:40:8) was used as the one-dimensional development solvent, and chloroform:acetone:methanol:acetic acid and water (50:20:10:15:5) was used as the two-dimensional development solvent. The color development method used a Dittmer-Lester spray reagent. After the development, the portions corresponding to the respective phospholipids were individually scraped off, wet-decomposed, and subjected to colorimetric determination by molybdenum blue absorptiometry.

<Preparation of Yeast Digest 1>

To a 10% by weight water suspension of 100 parts by weight of cultured cells of Torula yeast (in terms of dry weight), 4 parts by weight of DENATYME GEL (NAGASE & Co., Ltd.) and 4 parts by weight of ALCALASE 2.4LFG (Novozymes) were added, thereby solubilizing the yeast cells. The solubilization rate was 80%. To this product, 42.86 parts by weight of a yeast extract residue "KR Yeast" (manufactured by KOHJIN Life Sciences Co., Ltd.) as an excipient was added, and concentrated. The concentrate was dried with a double drum dryer (heat transfer area: 28.3 m$^2$, drum surface temperature: 155° C., drum rotation speed: 2.0 rpm, supply speed: 600 L/hr), and used as the yeast digest 1. The proportion of the water-soluble component in the yeast digest 1 was 56% by weight, the peptide content was 33.6% by weight, the RNA content was 7%, the free amino acid content was 12.5% by weight, the dietary fiber content was 17.5%, the phospholipid content was 2.2%, and the total content of guanylic acid and inosinic acid was 3%.

<Preparation of Yeast Digest 2>

10% by weight water suspension of 100 parts by weight (in terms of dry weight) of cultured cells of a bread yeast was incubated for 20 hours, subjected to autolysis treatment, and dried to obtain a yeast digest 2. The peptide content in the yeast digest 2 was 17.4% by weight, the RNA content was 4.4%, the free amino acid content was 8.5% by weight, the dietary fiber content was 26.2%, and the total content of guanylic acid and inosinic acid was 2%.

Example 1

100 parts by weight of a roast chicken oil (manufactured by Maruzen Food Industry Co., Ltd.) was heated to 95° C., and 0.2 parts by weight of the yeast digest 1 prepared above was added thereto. Thereafter, the object was maintained at 95° C. for 15 minutes, and then cooled, thus obtaining a chicken oil of Test Section 1.

Comparative Example 1-1

A chicken oil of Comparative Section 1-1 was obtained in the same manner as in Example 1, except that the yeast digest 1 was not added.

Comparative Example 1-2

A chicken oil of Comparative Section 1-2 was obtained in the same manner as in Example 1, except that 0.2 parts by weight of the yeast digest 1 was added, and no heating was performed.

Comparative Example 1-3

A chicken oil of Comparative Section 1-3 was obtained in the same manner as in Example 1, except that "AROMILD", which is a yeast extract free from cell wall fraction (manufactured by KOHJIN Life Sciences Co., Ltd., peptide content is 7.7% by weight, RNA content is 0%, free amino acid content is 7.6% by weight, dietary fiber content is 1.6%, phospholipid content is 0%, and the total content of guanylic acid and inosinic acid is 20%) was used in place of the yeast digest 1.

The chicken oils of Comparative Section 1-1, Comparative Section 1-2, Comparative Section 1-3, and Test Section 1 were melted in a hot water bath, and then the flavor at 80° C. was evaluated. Test Section 1 had a reduced oxidized odor, and an enhanced fragrance and an enhanced feel of livestock meat in comparison with Comparative Section 1-1, Comparative Section 1-2, and Comparative Section 1-3.

Example 2

A pork oil of Test Section 2 was obtained in the same manner as in Example 1, except that a roast pork oil (manufactured by Maruzen Food Industry Co., Ltd., hereinafter the same) was used in place of the roast chicken oil.

Comparative Example 2

A pork oil of Comparative Section 2 was obtained in the same manner as in Comparative Example 1, except that a roast pork oil was used in place of the roast chicken oil.

The pork oils of Comparative Section 2 and Test Section 2 were melted in a hot water bath, and then the flavor at 80° C. was evaluated. Test Section 2 had a reduced oxidized odor, an enhanced fragrance and an enhanced feel of livestock meat, and an enhanced profound feeling of taste in comparison with Comparative Section 2.

Example 3

An oil of Test Section 3 was obtained in the same manner as in Example 1, except that a canola oil (available Hanamasa Co., Ltd.) was used in place of the roast chicken oil.

Comparative Example 3

An oil of Comparative Section 3 was obtained in the same manner as in Comparative Example 1, except that a canola oil was used in place of the roast chicken oil.

The oils of Comparative Section 3 and Test Section 3 were warmed in a hot water bath, and then the flavor at 80° C. was evaluated. Test Section 3 had a reduced oxidized odor, and an additional livestock oil-like flavor in comparison with Comparative Section 3.

Example 4

A pork oil of Test Section 4 was obtained in the same manner as in Example 1, except that the yeast digest 2 was used in place of the yeast digest 1.

Comparative Example 4-1

A pork oil of Comparative Section 4-1 was obtained in the same manner as in Example 4, except that the yeast digest 2 was not added.

The chicken oils of Comparative Section 4-1 and Test Section 4 were melted in a hot water bath, and then the flavor at 80° C. was evaluated. Test Section 4 had a reduced oxidized odor, and an enhanced fragrance and an enhanced feel of livestock meat in comparison with Comparative Section 4-1, though the achieved effect was lower than that of the yeast digest 1.

INDUSTRIAL APPLICABILITY

The flavor oil/fat of the present invention can be used in processed food such as meat products, ramen, side dishes, and frozen food, or various seasonings.

The invention claimed is:

1. A flavor oil/fat comprising:
a yeast digest; and
an edible oil/fat,
wherein the flavor oil/fat is obtained by adding the yeast digest to the edible oil/fat, and heating the edible oil/fat with the yeast digest added thereto,
wherein the yeast digest comprises a peptide content that is 30% by weight or more, and
wherein the yeast digest comprises a total content of guanylic acid and inosinic acid that is 2% by weight or less, a total RNA content that is 4% by weight or more, and a dietary fiber content that is 10% by weight or more.

2. The flavor oil/fat according to claim 1, wherein the yeast digest includes a water-soluble component derived from a yeast, an insoluble component derived from a yeast, and a lipid derived from a yeast, and
the water-soluble component after solubilization of the yeast and prior to addition to the flavor oil/fat is 65% or more of the yeast digest.

3. The flavor oil/fat according to claim 2, wherein the flavor oil/fat is obtained by adding 0.05 to 10 parts by weight of the yeast digest according to claim 2 to 100 parts by weight of an edible oil/fat, and heating the edible oil/fat with the yeast digest added thereto.

4. The flavor oil/fat according to claim 1, wherein a heating temperature is 85° C. to below 130° C., and a temperature retention time of the heating temperature is 1 minute to 18 hours.

5. A method for producing a flavor oil/fat, comprising:
adding 0.05 to 10 parts by weight of the yeast digest according to claim 2 to 100 parts by weight of an edible oil/fat; and
heating the edible oil/fat with the yeast digest added thereto at 85° C. or higher for a temperature retention time of 1 minute or more.

6. The flavor oil/fat according to claim 2, wherein the flavor oil/fat is obtained by adding 0.05 to 10 parts by weight of the yeast digest according to claim 2 to 100 parts by weight of an edible oil/fat, and heating the edible oil/fat with the yeast digest added thereto.

7. The flavor oil/fat according to claim 2, wherein a heating temperature is 85° C. or higher, and a temperature retention time of the heating temperature is 1 minute or more.

8. The flavor oil/fat according to claim 1, wherein the yeast digest comprises a free amino acid content that is 8% by weight or more.

* * * * *